United States Patent Office 3,255,971
Patented June 14, 1966

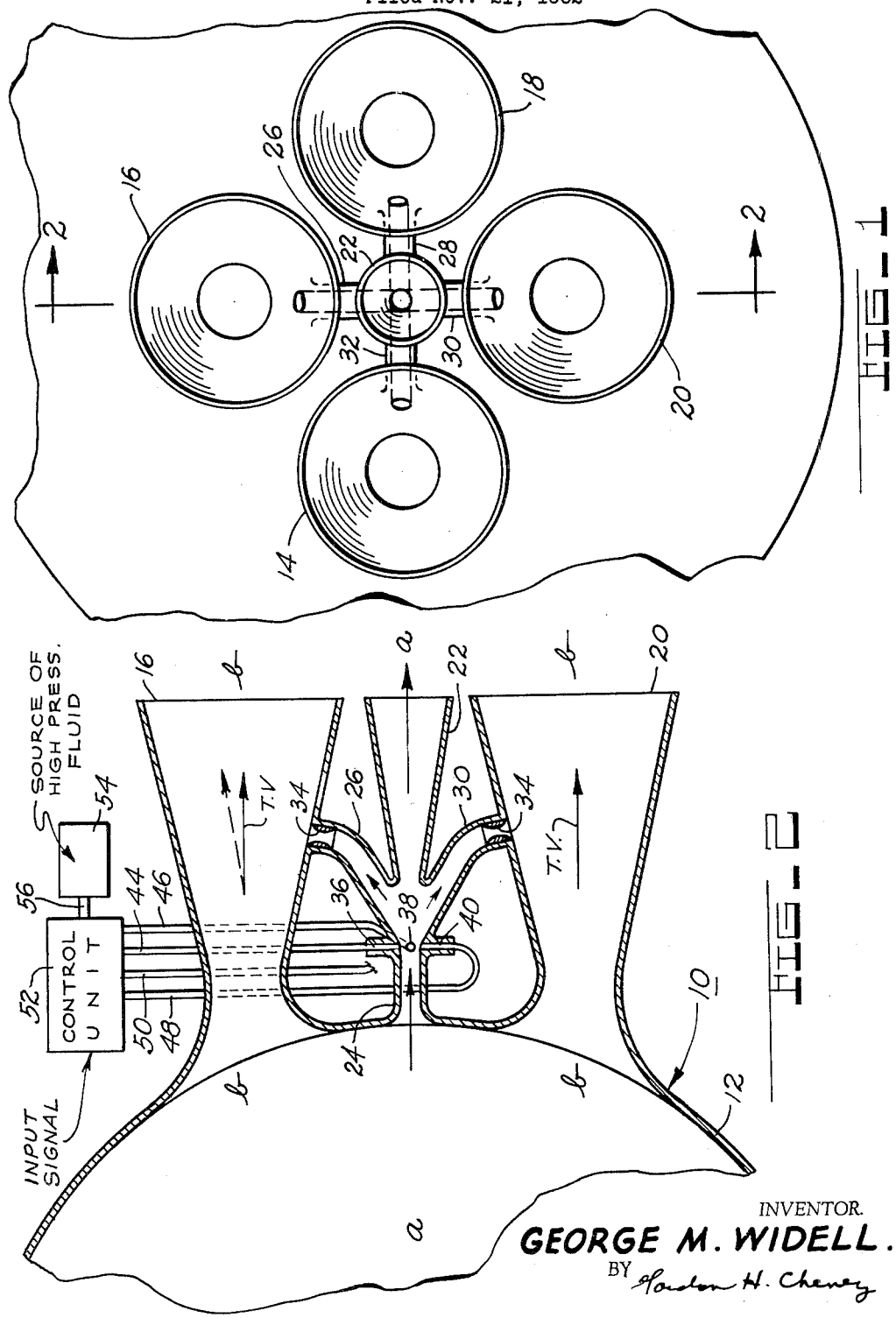

1

3,255,971
JET THRUST VECTOR CONTROL APPARATUS
George M. Widell, South Bend, Ind., assignor to The Bendix Corporation, South Bend, Ind., a corporation of Delaware
Filed Nov. 21, 1962, Ser. No. 239,245
5 Claims. (Cl. 239—265.23)

This invention relates to means for controlling the jet thrust vector and thus the flight path of a jet propelled vehicle.

Various forms of jet thrust vector control apparatus have been proposed to date, one of which takes the form of injection nozzles connected to a source of high pressure fluid such as compressed air, combustion chamber gas, or nitrogen and arranged to inject the high pressure fluid into the nozzle transversely to the stream of thrust producing gas flowing through the nozzle thereby creating a corresponding deflecting effect on the thrust vector of the thrust producing gas. However, it has been found that such an arrangement, particularly in the case of large nozzles having a correspondingly large jet, is disadvantageous in that a considerable volume of high pressure fluid such as compressed air or nitrogen must be provided to maintain thrust vector control for any significant length of time depending upon the degree of thrust vector control exercised. Also, for large rates of flow of the compressed fluid through the injector nozzles, the valves and associated flow control apparatus must be sufficiently large which imposes space and weight problems in cases where the vehicle weight must be held to a minimum and space is at a premium. It is therefore an object of this invention to provide a fluid amplifier for controlling jet thrust vector by fluid injection.

It is another object of the present invention to provide jet thrust deflection apparatus which utilizes a small amount of compressed fluid to produce a relatively large deflection of the jet.

It is still another object of the present invention to provide jet thrust deflection apparatus which utilizes a high pressure fluid in combination with a portion of the jet gas flow to effect a deflection of the remaining portion of the jet gas flow.

Other objects and advantages of the present invention will become apparent from the following description taken in conjunction with the drawings wherein:

FIGURE 1 represents a schematic illustration of the aft portion of a jet propelled missile embodying the present invention; and FIGURE 2 is a sectional view taken on line 2—2 of FIGURE 1.

Referring to the drawings, numeral 10 designates the aft portion of a jet propelled vehicle provided with a casing 12 and four rearwardly directed fixed converging-diverging primary thrust nozzles 14, 16, 18 and 20 extending therefrom. Fuel, either solid or liquid, disposed within casing 12 is burned to provide hot motive gas which flows through the thrust nozzles 14, 16, 18 and 20 to the atmosphere thereby providing thrust energy for propelling the vehicle. Conventional ignition means, not shown, operative on demand is utilized to initiate combustion of the fuel stored within casing 12.

The nozzles 14, 16, 18 and 20 are arranged radially outwardly from longitudinal axis $a$—$a$ of casing 12 and are circumferentially spaced with longitudinal axes $b$—$b$ ninety degrees apart and parallel to axis $a$—$a$. A thrust vector associated with each of the nozzles 14, 16, 18 and 20 is identified by an arrow labeled T.V. which is collinear with associated axis $b$—$b$. The resultant vector of the four nozzle vectors is collinear with the longitudinal axis $a$—$a$ such that the vehicle is propelled along a substantially straight flight path.

2

Directional control over the vehicle may be maintained by varying the thrust vector angle relative to the axis $b$—$b$ of one or more of the primary thrust nozzles 14, 16, 18 and 20 to thereby create a corresponding turning movement about the center of gravity of the vehicle and thus a deviation in the flight path of the vehicle as desired. For instance, yaw motion of the vehicle about its center of gravity may be effected by angular deflection of the thrust vector of primary thrust nozzles 14 or 18 to the left or right, respectively, as viewed in FIGURE 1. The pitch motion of the vehicle about its center of gravity may be effected by angular deflection of the thrust vectors of primary thrust nozzles 16 or 20 upwardly or downwardly, respectively, as desired. Combined yaw and pitch motion may be effected by coordinating angular deflection of the thrust vectors of two of the primary thrust nozzles 14, 16, 18 and 20 not in the same horizontal or vertical plane.

To attain the abovementioned directional control of the vehicle through suitable variations in the thrust vector angle of primary thrust nozzles 14, 16, 18 and 20, applicant provides a secondary thrust nozzle 22 having its longitudinal axis collinear with longitudinal axis $a$—$a$. The nozzle 22 has an inlet section 24 openly connected with the interior of casing 12 such that the hot motive gas generated during the combustion process flows continuously through the secondary nozzle 22 to the atmosphere thereby generating thrust energy which augments the thrust energy derived from primary nozzles 14, 16, 18 and 20. Four passages 26, 28, 30 and 32 circumferentially spaced apart at equal intervals about longitudinal axis $a$—$a$ are openly connected at one end with the interior of secondary nozzle 22 and at the opposite end with the interior of primary nozzles 14, 16, 18 and 20, respectively, at a point approximately midway between the throat and discharge end of the primary nozzles. The longitudinal axes of passages 26 and 30 are in the plane of axes $b$—$b$ of primary nozzles 16 and 20 and the longitudinal axes of passages 28 and 32 are in the plane of axes $b$—$b$ of primary nozzles 14 and 18. The passages 26, 28, 30 and 32 flare radially outwardly and rearwardly from secondary nozzle 22 at an angle preferably in the range between 6° and 36° relative to the longitudinal axis $a$—$a$. Also, it is preferable to make the inside diameter of each of the passages 26, 28, 30 and 32 approximately 30% greater than the inside diameter of the secondary nozzle 22 upstream from the junction of passages 26, 28, 30 and 32. A restriction 34 located in the downstream end of each of the passages 26, 28, 30 and 32 serves to increase the velocity of gas flow therethrough.

The gas flow through the secondary nozzle 22 is deflected in the direction of passages 26, 28, 30 or 32 by a flow of pressurized gas which is injected through ports 36, 38, 40 and 42 into the secondary nozzle 22 transversely to the flow of gas therethrough. Port 42 is not shown by virtue of being out of the plane of FIGURE 2. Passages 44, 46, 48 and 50 communicate ports 36, 38, 40 and 42, respectively, with a control unit 52 to which high pressure gas such as nitrogen or the like is supplied from a source 54 via passage 56.

The control unit 52 includes conventional valve mechanism, not shown, responsive to an input signal to control unit 52 which signal may be representative of a desired correction in the flight path of the vehicle. Normally, with a zero input signal, the valve mechanism of control unit 52 will occupy a null position whereby the flow of high pressure gas from source 54 to passages 44, 46, 48 and 50 is blocked. Depending upon the magnitude of the input signal, the valve will move to a position whereby the high pressure gas is permitted to flow from source 54 to at least one of the passages 44, 46, 48 or 50. The control unit 52 is conventional in structure and function and those persons skilled in the appropriate art will recognize that the specific details of control unit 52 and associated structure are not necessary to fully understand the present invention.

The ports 36, 38, 40 and 42 are formed in the wall of secondary nozzle 22 with ports 36 and 40 axially aligned in the plane of axes b—b of primary nozzles 16 and 20 and ports 38 and 42 axially aligned in the plane of axes b—b or primary nozzles 14 and 18. The high pressure gas injected through ports 34 or 38 deflects the secondary nozzle gas flow causing it to flow through passage 28 or 32, respectively, whereas the gas injected through port 36 or 40 deflects the secondary nozzle gas flow causing it to flow through passage 30 or 26, respectively. The secondary nozzle gas flow deflected through passage 26 as a result of gas flow through port 40, for example, increases in velocity as it passes through restriction 34 from which it discharges into primary nozzle 16 transversely to the flow of gas therethrough. The transverse flow of gas intercepts the gas flowing adjacent the diverging wall of primary nozzle 16 causing the intercepted gas flow to deflect radially inwardly which, in turn, results in a corresponding deflection in the effective direction of primary nozzle gas flow as shown by the dashed thrust vector of FIGURE 2. The resulting turning movement impressed on the vehicle causes the vehicle to turn in a counterclockwise direction as viewed in FIGURE 2 about its center of gravity. In a similar manner, the vehicle may be made to turn in the opposite direction by diverting the secondary nozzle gas flow through passage 30 to effect a deflection of the thrust vector of primary nozzle 20 or may be made to turn at right angles thereto by diverting the secondary nozzle gas flow through passage 28 or 32 to effect deflection of the thrust vector of primary nozzles 18 or 14, respectively.

It will be noted that the abovementioned thrust vector control is accomplished efficiently and effectively. The continuous flow of combustion gas through the secondary nozzle 22 is readily converted to thrust energy by the secondary thrust nozzle 22 when thrust vector deflection of the primary nozzles 14, 16, 18 and 20 is not desired. When thrust deflection of the primary nozzles is desired, a relatively small mass flow of gas from source 54 effectively diverts the relatively large mass flow of gas flowing through secondary nozzle 22 to one or more of the primary nozzles 14, 16, 18 and 20 to effect deflection of the primary nozzle gas flow. In comparison to prior art devices wherein auxiliary gas flow from a source such as 54 is injected directly to the primary thrust nozzles to effect thrust vector control, it is readily apparent that the present invention does not require the volume and/or weight of auxiliary gas for a given effect on the thrust vector of primary thrust nozzles 14, 16, 18 and 20 which, in turn, minimizes the weight penalty imposed on the vehicle for carrying out the thrust vector control.

The present invention is equally applicable to rocket motors with a single primary thrust nozzle in which case the passages 26, 28, 30 and 32 are arranged to inject gas at four equally spaced circumferential locations in the diverging portion of the single nozzle.

It will be understood that various changes and modifications in the structure shown and described may be made by those persons skilled in the art without departing from the spirit of the invention.

I claim:

1. Thrust vector control apparatus for a jet vehicle having a combustion chamber and a primary thrust producing converging-diverging nozzle connected to receive the gaseous products of combustion, said thrust vector control apparatus comprising:
    a source of high presusre gas;
    a secondary thrust producing converging-diverging nozzle connected to receive the gaseous products of combustion in parallel flow relationship with the primary thrust nozzle;
    a first passage connecting said secondary nozzle upstream from the diverging portion thereof with the primary nozzle at the diverging portion thereof;
    a radially extending port in the wall of said secondary nozzle;
    a second passage connecting said source with said port;
    and control means for selectively opening and closing said last named passage to control flow therethrough;
    said high pressure gas being injected through said port into said secondary nozzle to deflect the flow of gaseous products of combustion therethrough toward said first passage;
    said deflected flow of gas being injected into the primary nozzle to effect deflection of the flow of gaseous products of combustion therethrough.

2. Thrust vector control apparatus for a jet vehicle having a combustion chamber and a primary thrust producing converging-diverging nozzle connected to receive the gaseous products of combustion, said thrust vector control apparatus comprising:
    a secondary thrust producing converging-diverging nozzle connected in parallel flow relationship with the primary nozzle and fixed in position with the longitudinal axis thereof parallel to the longitudinal axis of the primary nozzle;
    a passage connecting said secondary nozzle intermediate the inlet and diverging portions thereof with said primary nozzle at the diverging portion thereof;
    and means operative on demand for deflecting the gaseous products of combustion flowing through said secondary nozzle into said passage;
    said flow of gaseous products of combustion being injected from said passage into said primary nozzle to effect deflection of the flow of gaseous products of combustion therethrough.

3. Thrust vector control apparatus for a jet vehicle having a combustion chamber and a plurality of primary thrust producing converging-diverging nozzles connected to receive the gaseous products of combustion, said thrust vector control apparatus comprising:
    a source of high pressure gas;
    a secondary thrust producing converging-diverging nozzle connected in parallel flow relationship with the primary nozzles;
    a plurality of circumferentially equally spaced apart passages connecting said secondary nozzle upstream from the diverging portion thereof with the diverging portion of the primary thrust nozzles;
    a plurality of ports circumferentialy equally spaced in the wall of said secondary thrust nozzle and extending radially therethrough;
    a plurality of conduits connecting said plurality of ports with said source of high pressure gas;
    and means operative on demand for controlling the flow of high pressure gas through said conduits to said ports;
    said high pressure gas being injected through at least one of said ports to cause deflection of said gaseous products of combustion flowing through said secondary nozzle into one of said passages which, in turn, discharges into one of said primary nozzles to effect deflection of the gaseous products of combustion flowing therethrough.

4. Thrust vector control apparatus for a jet vehicle having a combustion chamber and a plurality of primary thrust producing converging-diverging nozzles connected to receive the gaseous products of combustion, said thrust vector control apparatus comprising:
    a source of high pressure gas;
    a secondary thrust producing converging-diverging nozzle connected in parallel flow relationship with the primary nozzles;
    a plurality of passages openly communicating the interior of said secondary nozzle at circumferentially spaced apart locations with the plurality of primary nozzles at the diverging portion thereof;

said passages each extending rearwardly and radially outwardly from said spaced apart locations into open communication with the interior of an associated primary nozzle;

a plurality of circumferentially spaced apart radially extending ports formed in the wall of said secondary nozzle;

a separate conduit communicating each of said ports with said source of high pressure gas;

valve means operatively connected to said conduits for controlling flow of the high pressure gas therethrough to said ports;

said high pressure gas being discharged through at least one of said ports to thereby divert the flow of gaseous products of combustion through said secondary nozzle into one of said passages from which the flow of gaseous products of combustion is discharged into the associated primary nozzle to thereby deflect the flow of gaseous products of combustion therethrough.

5. Thrust vector control apparatus for a jet vehicle having a combustion chamber and a plurality of primary thrust producing converging-diverging nozzles connected to receive the gaseous products of combustion, said thrust vector control apparatus comprising:

a source of high pressure gas;

a secondary thrust producing converging-diverging nozzle connected in parallel flow relationship with the primary nozzles;

a separate passage connecting the interior of each of the primary nozzles at the diverging portion thereof with the interior of said secondary nozzle;

and means operatively connected to said secondary nozzle and said source for injecting said high pressure gas into said secondary nozzle transversely to the flow of gaseous products of combustion therethrough to thereby divert the flow of gaseous products of combustion into one of said passages;

said flow of gaseous products of combustion through said one passage being injected into the corresponding primary nozzle transversely to the flow of gaseous products of combustion therethrough to thereby deflect the same.

References Cited by the Examiner

UNITED STATES PATENTS

| | | | |
|---|---|---|---|
| 3,001,698 | 9/1961 | Warren | 137—83 X |
| 3,036,430 | 5/1962 | Eggers et al. | 60—35.54 |
| 3,066,485 | 12/1962 | Bertin et al. | 60—35.54 |
| 3,069,850 | 12/1962 | Ledwith et al. | 60—35.54 |
| 3,116,603 | 1/1964 | Hausmann | 60—35.54 |

FOREIGN PATENTS 1,197,701 6/1959 France.
1,278,782 11/1961 France.

OTHER REFERENCES

Dofl Publication: "Rocket Thrust Vectoring" by A. B. Holmes, appearing in the Proceedings of the Fluid Amplification Symposium, October 1962, vol. 1, published by Diamond Ordnance Fuze Laboratories, Wash. 25, D.C., pages 73–79 relied on.

MARK NEWMAN, *Primary Examiner.*

ABRAM BLUM, SAMUEL LEVINE, *Examiners.*

W. A. SHUETZ, A. L. SMITH, *Assistant Examiner.*